June 24, 1969   R. E. LEE   3,451,100
SHRIMP DEHEADING DEVICE
Filed April 28, 1967   Sheet 2 of 2
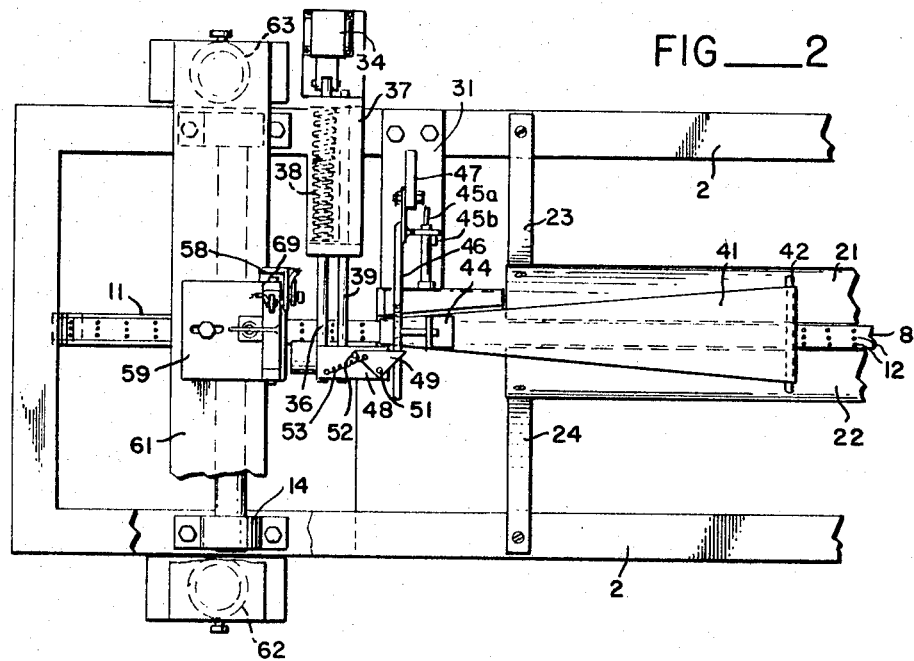
FIG__2
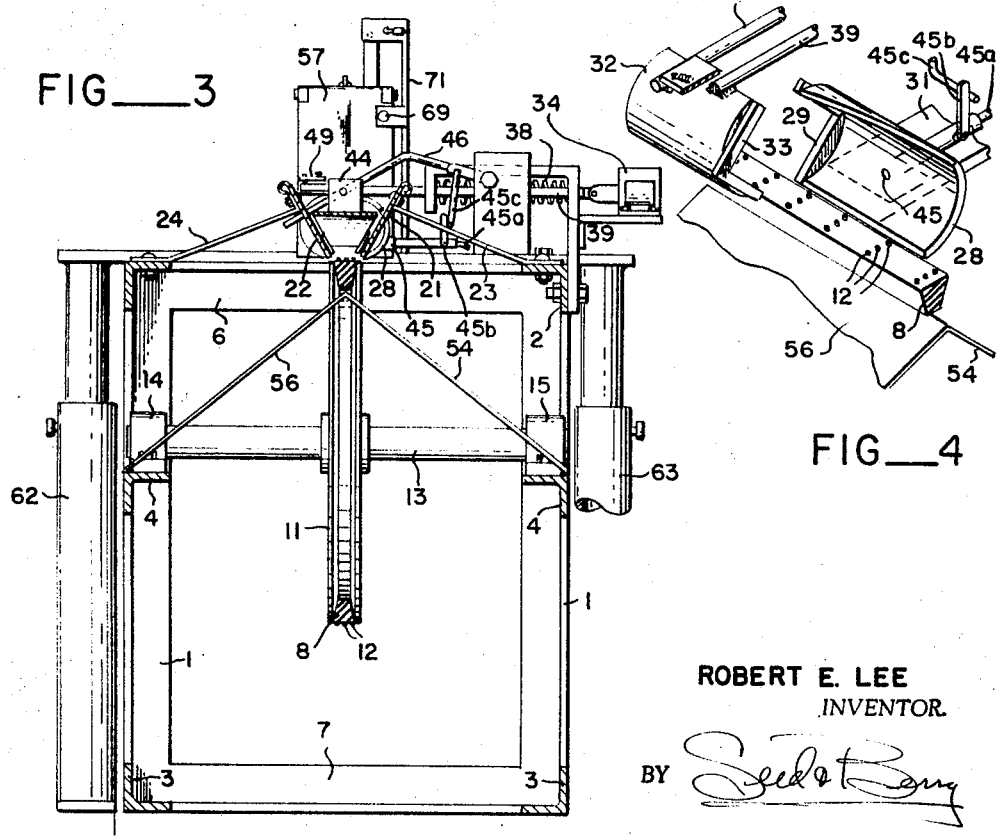
FIG__3
FIG__4
ROBERT E. LEE
INVENTOR.
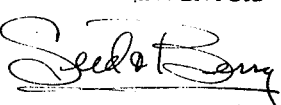
ATTORNEYS

United States Patent Office 3,451,100
Patented June 24, 1969

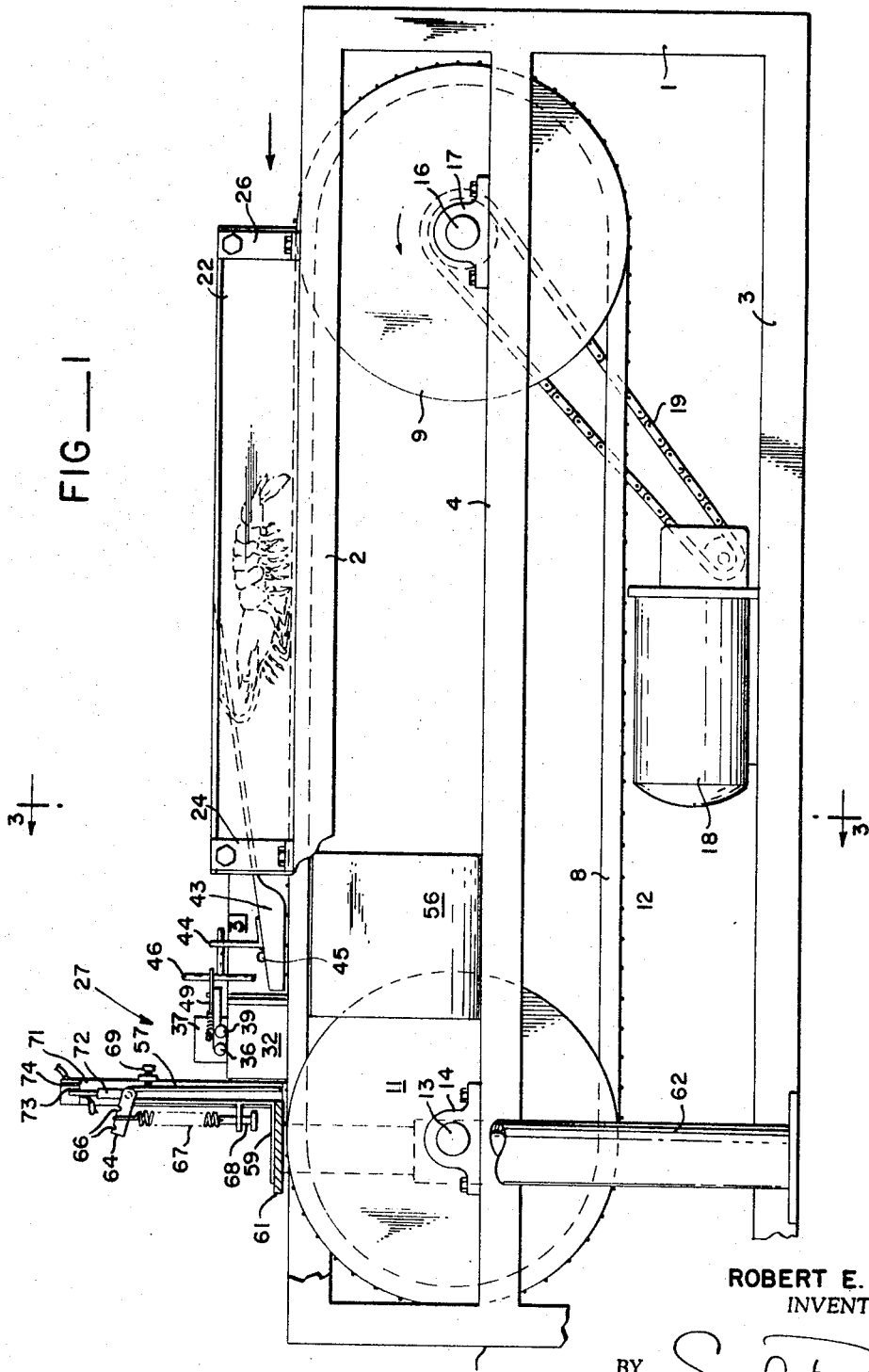

3,451,100
SHRIMP DEHEADING DEVICE
Robert E. Lee, Blaine, Wash., assignor of one-half to
Eythor G. Westman, Blaine, Wash.
Filed Apr. 28, 1967, Ser. No. 634,623
Int. Cl. A22c 29/00
U.S. Cl. 17—71                                      10 Claims

ABSTRACT OF THE DISCLOSURE

A shrimp deheading device in which the whole shrimps are conveyed on a narrow belt conveyor within a trough and into a restricted throat. The head or tail is cleanly and rapidly severed and removed from the belt by a receprocating cutter head which moves across the belt when triggered by switch means actuated by movement of the shrimp to the cutting station. Return movement of the cutter head serves to release the remaining portion of the shrimp and to actuate a water jet for ejecting it from the belt. More particularly, the invention relates to an improved device for separating the head from the shrimp body in a rapid and efficient manner without damage to the edible body portion. The present invention contemplates a device which is sufficiently rapid and efficient in its operation to be suitable for commercial use. The problem of conveying the shrimps, holding and cutting, and then distributing or segregating the parts becomes quite difficult because of the irregularity in size and shape. Conveying techniques developed in the past have included grasping the shrimps by their feelers, roll conveying, water currents etc. The different cutting techniques used range from high velocity fluid jets and differential squeeze rolls to circular knives and the like. These methods often result in damage to the edible portion of the shrimp and are generally unsatisfactory.

---

The present invention has the object of providing a shrimp deheading device in which the whole shrimps are conveyed on a belt conveyor. The head is cleanly and rapidly severed from the body by means of a reciprocating cutter head, the motion of which is used in cooperation with other means to separate the severed heads and bodies, the action of the cutter head being triggered by the movement of an individual shrimp to the cutting position.

Another object of the present invention is to provide a device of the character described which operates with improved rapidity and efficiently and which eliminates damage to the edible portion of the shrimp.

These and other objects and advantages of the present invention will be apparent to those skilled in the art from the following specification and appended claims and from the accompanying drawings wherein:

Description of Drawings

FIG. 1 is a side elevational view of the device;
FIG. 2 is a top plan view of the cutter portion of the device;
FIG. 3 is a cross sectional view taken along lines 3—3 of FIG. 1; and
FIG. 4 is an elevational detail of the cutter heads.

Description of invention

Referring now to the drawings wherein like reference numerals indicate identical parts in the various views, the machine frame, which may vary in design constitutes, in the present instance, the vertical angle irons 1, the upper longitudinal angle irons 2, the lower longitudinal angle irons 3, the intermediate longitudinal angle irons 4 and the upper and lower transverse angle irons 6 and 7 respectively on each end of the frame. The various angle irons described may be welded or bolted together as desired to form a somewhat box-like frame structure.

A belt conveyer is mounted for operation longitudinally of the frame intermediate the longitudinal frame members and comprises the endless belt 8 trained about the pulleys 9 and 11. The belt 8 may be of a V-belt configuration of a width suitable for supporting a shrimp extending longitudinally therealong. Belt 8 is provided with spaced studs or projections 12 on its upper surface in order to prevent slippage between the shrimp and the belt surface. The projections 12 will normally extend upwardly approximately 1/16 of an inch from the surface of the belt. The pulley wheel 11 is fixed to a cross shaft 13 journal in the blocks 14 and 15 supported by the angle irons 4. Likewise, the pulley 9 is fixed to a drive shaft 16 extending transversely of the members 4 and journalled in suitable bearing blocks, one of which is shown at 17 in FIG. 1. The shaft 16 may be driven by means of an electrical motor or the like 18 by means of a chain drive 19 in a conventional manner as illustrated in FIG. 1.

The upper run of the belt 8 is located between the inclined plates 21 and 22 which form a V-trough with the belt located at the bottom thereof. The plates 21 and 22 may be supported in position by the brackets 23 and 24 at one end identical or similar brackets at the opposite end, one of which is shown at 26 in FIG. 1. The brackets are supported from the longitudinal angle irons 2 as illustrated most clearly in FIGS. 2 and 3. The shrimp are fed onto the belt 8, which travels in the counterclockwise direction as seen in FIG. 1, from the right end as viewed in FIG. 1 and are conveyed along the V-trough head first toward the cutter section indicated generally at 27 in FIG. 1.

Mounted on one side of the conveyor adjacent the end of the plate 21 is a fixed cutter head 28 which may be semicircular in cross section and includes a cutter blade 29 across the end thereof remote from the end of the plate 21. The cutter head 28 may be mounted on a support bar 31 fixed to the longitudinal angle iron 2 as shown in FIG. 2. The bar 31 will be of such a dimension as to maintain the head 28 in a fixed rigid position. A cooperating moveable cutter head 32 is mounted adjacent the head 28 and is provided with a blade 33. The head 32 is normally located on the opposite side of the belt 8 from the head 28 and the blade 33 coacts with the blade 29 to sever the head from the body of the shrimp when the head 32 is moved transversely across the conveyor belt. The cutter head 32 is caused to reciprocate by means of the solenoid 34, the armature of which is connected to a pull rod 36 mounted for sliding movement in the inverted U-shaped bracket 37 carried on the frame member 2 as seen most clearly in FIG. 2. The solenoid 34 when energized serves to move the head 32 rapidly across the belt 8 to sever the shrimp head from the body when the shrimp is in the cutting position as will be presently described. The cutter head 32 is returned by means of the compression spring 38 which surrounds the rod 36 and may act between a collar or the like on the rod and one end of the bracket 37. An additional guide rod 39 may also be provided for the purpose of insuring straight line travel of the cutter head.

In order to provide a guide or restricted throat through which the shrimp passes into the cutting position, a triangular shaped cover plate 41 is hinged between the inclined side plates 21 and 22 on a cross shaft 42 as illustrated most clearly in FIG. 2. The sides of the cover plate 41 converge in the direction of travel of the belt 8 so as to allow the plate 41 to be inclined downwardly and forwardly as shown in FIG. 1. At the narrow end of the plate 41, the plate includes a downwardly curved side wall 43 opposite the stationary plate 28 for the purpose of preventing the shrimp from rolling off of the belt as it exits from the V-trough. The pivoted cover plate 41 extends forwardly to a position adjacent the cutter plate 33 of the head 32. The sides of the plate 41 may be so angled as to maintain the lower end of the plate a slight distance above the travelling belt 8. A bracket 44 is fixed to the lower end of the plate 41 for receiving an actuating arm presently to be described.

To provide for positive ejection of the severed tail section of the shrimp from the conveyor 8, the stationary plate 28 is fitted with a nozzle 45 to which is connected a water supply conduit 45a. The conduit 45a may be connected to any source of water under pressure and a normally closed valve 45b is provided to control the flow of water. The valve 45b may be any standard spring closed valve known to the art with a suitable operating handle as illustrated. The valve is operated so as to open upon raising of the plate 41 as will be described by means of the arm 45c. The arm for actuating the plate 41 and to which the arm 45c is connected comprises the bent arm or rod 46 one end of which is received in the bracket 44. The other end of the rod 46 is rotatably mounted in the vertical bracket 47 welded or otherwise affixed to the bar 31. The arm 46 is utilized to raise the inclined plate 41 upon return of the reciprocable cutter head 32 as will presently be described.

A mounting plate 48 is fixed to the top side of the cutter head 32 for the purpose of rotatably mounting the actuator dog 49 which is pivoted to the plate 48 by the pin 51. A stop pin 52 is also mounted on the plate 48 to limit the counterclockwise rotation of the plate 49 and a tension spring 53 is connected between the dog 49 and the plate 48 and serves to hold the dog 49 against the stop pin 52. As will be noted from FIGS. 2 and 3, upon reciprocation of the cutter head 32, and the dog 49 travels in a path which intersects the inclined portion of the arm or rod 46. During the cutting stroke, when the dog 49 contacts the rod 46, the dog is rotated in a clockwise direction against relatively light tension of the spring 53. When the dog 49 clears the arm 46, it snaps back to the position shown in FIG. 2. On the return stroke of the cutter head, the dog 49 contacts rod 46 and lifts it, and consequently the lower end of the plate 41, to allow the shrimp body to be removed as the cutter head 32 returns. Raising of the rod 46 also opens the valve 45b to allow a jet of water to positively eject the shrimp from the conveyor 8. It will be realized, of course, that the action of the head 32 is extremely rapid so that the shrimp head is immediately severed by a cooperation of the knives 29 and 33 upon actuation of the plate 32. The plate 41 serves to guide the shrimp into alignment for cutting and also prevents slippage between the belt 8 and the shrimp insure substantially positive conveying of the shrimp. The heads, after being severed, are discharged downwardly onto the inclined pan 54 on one side of the machine, while the bodies or tails are discharged downwardly onto the pan 56 on the opposite side.

As aforementioned, the actuation of the cutter means is triggered by the movement of a shrimp into the cutting position. This is accomplished by means of a contact pressure actuated plate 57 located across the path of the moving shrimp on the belt 8 adjacent the end of the movable cutter head 32. The plate 57 is hinged on a pin 58 carried by an upstanding bracket 59 which is in turn supported on a transverse support member 61. The member 61 is supported for vertical adjustment by the telescoping uprights 62 and 63 which have set screws or the like for adjusting the elevation of the switch plate 57. Fixed to the upper end of the plate 57 is a crank arm 64 having several notches 66 for adjustably positioning a tensioning spring 67 connected to the screw member 68 carried on the angular bracket 59 for urging the switch plate 57 in a counterclockwise direction of rotation. The spring member 67, thus, holds the plate 57 against an adjustable stop screw 69 fixed to a bracket 71. Also connected to the upper end of the plate 57 is a switch contact arm 72 having an electrical contact 73 which is brought into contact with a similar contact point 74 carried on the bracket 71. The contact points 73 and 74 when in contact actuate a relay or the equivalent (not shown) for closing the electrical circuit through the solenoid 34 thus actuating the moveable cutter head 32. It would be possible, of course, to utilize a different form of triggering means instead of the plate 57, as for instance a photocell switching arrangement or its equivalent.

The plate 57 is shown in its normal posiiton in FIG. 1 with the contacts 73 and 74 being opened and the cutter head 32 being in its unactuated position. When a shrimp is conveyed by the belt 8 forwardly until it contacts the plate 57, the plate will be rotated clockwise against the light tensioning of the spring 67 so as to bring the contacts 73 and 74 together. This action causes energization of the solenoid 34 as previously explained resulting in actuation of the cutter head 32 which is rapidly drawn across the conveyor belt 8 to server and remove the head from the body or tail of the shrimp. The severed head falls downwardly over the pan 54 and, upon return stroke of the cutter head 32, the spring loaded dog 49 actuates the lift rod 46 and the water jet to insure that the tail is removed from the conveyor belt 8. The tail drops downwardly over the pan 56 and the tails and heads may be collected in any desirable manner. It will, of course, be understood that any means either manual or automatic may be used to load the shrimp onto the conveyor belt 8.

From the foregoing, it will be understood to those skilled in the art that the present invention offers significant advantages and improvements in shrimp deheading devices in the character described. The arrangement and types of structural components utilized within this invention may be subjected to numerous modifications well within the purview of this invention and applicant intends only to be limited to a liberal interpretation of the specification and the appended claims.

What I claim is:

1. A shrimp deheading device comprising in combination; conveyor means to support and convey a whole shrimp, first and second cooperating cutter head located on opposite sides of said conveyor, said first and second cutter heads corresponding in length to the head and tail portions of the shrimp, one of said cutter heads being heads being fixed, and control means responsive to the movable across said conveyor and the other of said cutter movement of a shrimp into position between said cutter heads for actuating said one cutter head to sever and remove the head from the tail of the shrimp.

2. The combination according to claim 1 wherein; said conveyor comprises an endless belt member for supporting the shrimp, first and second inclined plate members mounted on opposite sides of said belt forming laterial guide means, said cutter heads being located at the outlet end of said guide means.

3. The combination according to claim 2 wherein; the other of said cutter heads is fixed in posiiton immediately adjacent the outlet of said guide means, a vertically swingable cover plate mounted between said inclined side plates and having an end portion extending along the fixed cutter head to guide the shrimp therealong, and means responsive to return movement of said one cutter head for lifting said cover plate to allow the shrimp tail to be removed from the conveyor.

4. The combination according to claim 3 including; water jet ejection means associated with said fixed cutter head, and means responsive to the lifting of said cover plate for actuating said water jet ejection means.

5. A shrimp deheading device comprising; belt conveyor means for moving whole shrimp one at a time therealong in spaced relation, longitudinally extending guide members extending along said belt, means at the outlet end of said guide means forming a fixed cutter blade on one side thereof, a movable cutter head located on the opposite side of the conveyor, said movable cutter head including a second cutter blade cooperable with said fixed cutter blade to sever the shrimp, means to reciprocate said movable cutter head across said conveyor, and control means responsive to movement of a shrimp into cutting position to actuate said cutter head.

6. The device according to claim 5 including; a cover plate, means for mounting said cover plate for vertical swinging movement between said guide members, said cover plate including an end portion extending adjacetn said fixed cutter blade to form a restricted guide throat for the shrimp, and means actuated by return movement of said cutter head for lifting said cover plate to permit removal of the shrimp tail upon return of the cutter head.

7. The combination according to claim 5 including; water jet ejection means associated with said fixed cutter head, and means responsive to the lifting of said cover plate for actuating said water jet ejection means.

8. The device according to claim 6 wherein; said means to reciprocate said movable cutter head comprises an electrical power unit operatively connected therewith, said control means including, a normally open switch for completing an electrical circuit through said power unit, and a switch operator, said operator comprising a contact member extending across said belt adjacent said movable cutter head and in the path of oncoming shrimp, whereby said cutter head will be actuated upon movement of a shrimp adjacent thereto.

9. The device according to claim 8 including; closely spaced projections on the surface of said belt to provide for positive movement of the shrimp.

10. The device according to claim 8 wherein said power unit comprises a solenoid connected to move said cutter head in one direction, and spring means for returning said cutter head to the initial position.

References Cited

UNITED STATES PATENTS

| | | | |
|---|---|---|---|
| 1,367,546 | 2/1921 | Hirth et al. | 17—4 |
| 1,627,479 | 5/1927 | Bucknam | 17—3 |
| 1,677,579 | 7/1928 | Barry. | |
| 2,034,691 | 3/1936 | Bottker et al. | 17—2 |
| 2,794,209 | 6/1957 | Self | 17—2 |
| 2,888,709 | 6/1959 | Lapeyre | 17—2 |
| 3,020,583 | 2/1962 | Lapeyre et al. | 17—2 |
| 3,084,379 | 4/1963 | Henning | 17—45 |

LUCIE H. LAUDENSLAGER, *Primary Examiner.*

U.S. Cl. X.R.

17—52, 63

UNITED STATES PATENT OFFICE
CERTIFICATE OF CORRECTION

Patent No. 3,451,100                                                           June 24, 1969

Robert E. Lee

It is certified that error appears in the above identified patent and that said Letters Patent are hereby corrected as shown below:

Column 4, line 48, cancel "movable across said conveyor and the other of said cutter", and insert the same between lines 46 and 47, same column 4.

Signed and sealed this 14th day of April 1970.

(SEAL)
Attest:

Edward M. Fletcher, Jr.                                      WILLIAM E. SCHUYLER, JR.
Attesting Officer                                                       Commissioner of Patents